United States Patent [19]
Thuenker et al.

[11] Patent Number: 5,299,746
[45] Date of Patent: Apr. 5, 1994

[54] APPARATUS AND METHOD FOR DIRECT SOLID-FORTIFICATION OF FUELS WITH FERROCENE

[75] Inventors: Walther Thuenker, Bottrop; Gabriele Lohmann, Luenen; Arnim Marchewski, Gelsenkirchen, all of Fed. Rep. of Germany

[73] Assignee: Chemische Betriebe Pluto GmbH, Fed. Rep. of Germany

[21] Appl. No.: 935,282

[22] Filed: Aug. 26, 1992

[30] Foreign Application Priority Data

Sep. 4, 1991 [DE] Fed. Rep. of Germany ....... 4129408

[51] Int. Cl.$^5$ ............... F02M 23/00; F02D 19/12; F23K 5/08; C10L 1/30
[52] U.S. Cl. ................................ 241/36; 44/639; 241/21
[58] Field of Search ............... 241/21, 34, 35, 258, 241/36, 63; 44/629, 639, 903

[56] References Cited

U.S. PATENT DOCUMENTS

| | | | |
|---|---|---|---|
| 3,352,499 | 11/1967 | Campbell | 241/21 |
| 3,358,938 | 12/1967 | Brown | 241/21 |
| 3,383,190 | 5/1968 | Weber et al. | 44/639 X |
| 3,503,722 | 3/1970 | Weber et al. | 44/639 X |
| 4,362,534 | 12/1982 | Bird et al. | |
| 4,706,892 | 11/1987 | Klose | 241/34 X |
| 4,955,331 | 9/1990 | Hohr et al. | |

FOREIGN PATENT DOCUMENTS

3626419 2/1988 Fed. Rep. of Germany.
3801947 8/1989 Fed. Rep. of Germany.

Primary Examiner—Douglas D. Watts
Attorney, Agent, or Firm—Hill, Steadman & Simpson

[57] ABSTRACT

The invention relates to an apparatus and a method for direct addition of solid ferrocene to fuels. The liquid addition or fortification of fuels with ferrocene is known. The new apparatus and the new method enable an addition of solid ferrocene to fuels. The apparatus according to the present invention comprises a grinder being connected to a fuel conduit or a fuel tank, said grinder being filled with solid ferrocene. The apparatus further comprises a step motor being coupled to the grinder and includes a control means for said step motor. With respect to the method of the present invention it is proposed to measure the amount of fuel flowing through a fuel conduit, to determine the required amount of ferrocene therefrom and to add the so determined amount of ferrocene to the amount of fuel by actuating the grinder at the corresponding number of revolutions. The apparatus is preferably adapted to be installed in motor vehicles comprising an Otto-engine or a Diesel-engine in connection with a particle filter system being positioned downstream of the Diesel-engine or being adapted to be installed in a furnace for light or domestic fuel.

20 Claims, 5 Drawing Sheets

| REVOLUTIONS | MASS DIFFERENCES (GRAM) | MASS SUMS (GRAM) | REGRESSION |
|---|---|---|---|
| 1 | 0.101 | 0.101 | 0.092 |
| 2 | 0.095 | 0.196 | 0.198 |
| 3 | 0.106 | 0.302 | 0.305 |
| 4 | 0.109 | 0.411 | 0.411 |
| 5 | 0.107 | 0.518 | 0.518 |
| 6 | 0.096 | 0.614 | 0.625 |
| 7 | 0.118 | 0.732 | 0.731 |
| 8 | 0.103 | 0.835 | 0.838 |
| 9 | 0.110 | 0.945 | 0.944 |
| 10 | 0.114 | 1.059 | 1.051 |

FIG. 3

| REVOLUTIONS | MASS DIFFERENCES | MASS SUMS | REGRESSION |
|---|---|---|---|
| 2 | 0.187 | 0.187 | 0.188 |
| 4 | 0.236 | 0.423 | 0.409 |
| 6 | 0.217 | 0.640 | 0.630 |
| 8 | 0.198 | 0.838 | 0.852 |
| 10 | 0.219 | 1.057 | 0.073 |
| 12 | 0.231 | 1.288 | 1.294 |
| 14 | 0.222 | 1.510 | 1.515 |
| 16 | 0.242 | 1.752 | 1.736 |
| 18 | 0.204 | 1.956 | 1.958 |
| 20 | 0.227 | 2.183 | 2.179 |

| REVOLUTIONS | MASS DIFFERENCES | MASS SUMS | REGRESSION |
|---|---|---|---|
| 10 | 1.083 | 1.083 | 1.023 |
| 20 | 1.026 | 2.109 | 2.046 |
| 30 | 1.076 | 3.185 | 3.070 |
| 40 | 0.996 | 4.181 | 4.093 |
| 50 | 0.986 | 5.167 | 5.116 |
| 60 | 0.990 | 6.157 | 6.139 |
| 70 | 1.000 | 7.157 | 7.162 |
| 80 | 1.010 | 8.167 | 8.186 |
| 90 | 0.981 | 9.148 | 9.209 |
| 100 | 1.033 | 10.181 | 10.232 |

APPARATUS AND METHOD FOR DIRECT SOLID-FORTIFICATION OF FUELS WITH FERROCENE

BACKGROUND OF THE INVENTION AND DESCRIPTION OF THE PRIOR ART

The invention relates to an apparatus and a method for direct addition of solid ferrocene to fuels The advantages of fuels containing ferrocene, i.e. reduction of fuel consumption and of exhaust gas pollution and elimination or reduction of carbon dissipation are already described in German patent 3,801,947 with respect to Otto-engines provided with especially hardened seats for the outlet valves, as well as in German patent 3,715,473 with respect to Otto-engines being not provided with especially hardened seats for the outlet valves.

It is proposed in both of the above mentioned documents to directly add ferrocene to the fuel corresponding to the required amounts in accordance with the proposed concentration mentioned therein due to its good solubility by mixing. It is further proposed in the above mentioned documents to produce a concentrate of dissolved ferrocene and to add from this concentrate the required amount by volume to the fuel to adjust the desired concentration of ferrocene. In the document EP-A1-0,334,248, there is proposed an addition of ferrocene to the engine lubricating oil for Diesel-engines. According to the last mentioned document the addition to the engine lubricating oil represents an advantageous alternative to the addition to the Diesel-oil or to an additional metering apparatus. In all these known cases the ferrocene is added in a liquid or liquid-like form to the fuel.

SUMMARY OF THE INVENTION:

Accordingly, it is a basic object of the present invention to add ferrocene in another form to fuels in order to improve the fuel consumption and to reduce exhaust gas pollution.

It is a further object of the present invention to provide an apparatus for the direct addition of solid ferrocene to fuels by which ferrocene is not added to fuels during the production thereof but is added shortly before combustion of the fuel in the engine takes place.

It is another object of the present invention to provide a method of direct addition of solid ferrocene to fuels by means of a particularly structured apparatus.

These and other objects are solved by an apparatus which is characterized by a grinder or mill connected to a fuel conduit or to a fuel tank. The grinder is at least partially filled with solid ferrocene in form of small rods, pellets, pills, balls or mixtures thereof which are to be ground and, thereafter introduced into the conduit or the fuel tank. The apparatus is further provided with a driving motor coupled to the grinder or mill for driving the rotating grinding tools thereof, and the motor is controlled by a control means.

These and other objects are further solved by a method of direct addition of solid ferrocene to fuels by means of the above mentioned apparatus: The method includes the following steps:

(a) measuring the amount of fuel flowing through the fuel conduit;
(b) determining the required amount of ferrocene with respect to the amount of fuel measured according to step (a);
(c) determining the number of revolutions of the grinder according to the amount of ferrocene corresponding to step (b); and
(d) adding the amount of ferrocene as determined according to step (b) to the amount of fuel as determined according to step (a) by actuating the grinder according to, the number of revolutions as determined under step (c).

Further advantages of the present invention are mentioned in the following description and claims.

According to the present invention it is in practise possible by means of a grinder, a rotating step motor coupled thereto of driving the grinder, as well as by the control means for the step motor, to add the ferrocene to the fuel directly into a fuel tank, or into a fuel conduit adjacent to the engine, and to achieve thereby the above mentioned advantages relating to a reduction of fuel consumption and pollutant emission. Thus, it is only necessary to connect the grinder with a fuel conduit or the fuel tank. The apparatus according to the invention is simple in construction and easy to actuate without complicated instructions.

It is a further advantage of the invention that the grinder comprises a grinding chamber filled with ferrocene. In the grinding chamber there is positioned a stirrer used to homogenize the ferrocene particles filling the grinding chamber. Thus, the reproducibility of the amount of ferrocene being grinded by the grinder within a time unit at constant rotating speed is improved. It is also possible to substantially maintain constant the amount of ferrocene being ground by the grinder within a time unit at constant rotating speed.

According to an advantageous embodiment of the present invention the grinder includes a shaft. The stirrer is fixed to the shaft, and is rotatable therewith. Thus, an irregular descending of the solid ferrocene is substantially avoided and a uniform void volume is achieved in the bulk material located in the grinding chamber. It is a further advantage of the present invention that the ferrocene has the shape of pellets or pills, the diameter of which preferrably amounts to about 2.5 to 5 mm, (i.e. 0.098 to 0.197 inches). Hence, the grinding chamber can correctly be filled.

According to the invention the rotating speed of the grinder is about 0.25 revolutions per second. The required amounts of ferrocene may exactly be added to the fuel at the respective rotating speed. This feature further serves to substantially increase the reproducibility of the amount of ferrocene being delivered from the grinder.

According to the invention the step motor and the control means are constructed such that the grinder is rotatable in angular steps of of at least 1°. Thus, the amount of ferrocene being delivered from the grinder can precisely be added. This is also true even with very small amounts of ferrocene.

It is a further advantage of the invention that the control means can be provided with a data-processing equipment so that the whole apparatus can be actuated automatically or semi-automatically with a high degree of precision.

It is particularly advantageous that the apparatus according to the present invention is adapted to be installed in a motor vehicle including an Otto-engine or a Diesel-engine, with a particle filter system being positioned downstream of the Diesel-engine. Alternatively, the apparatus according to the invention may be installed in a furnace for light or domestic fuel. The required amount of ferrocene can simply be added in proportion to the respective amount of fuel to be filled into the tank. It is further possible to provide the apparatus in association with a tank plant or a gasoline transport vehicle or ship, rather than on a motor vehicle or furnace.

The the above mentioned respective steps provide a direct, precise addition of solid ferrocene to fuels. Thus an increased amount of ferrocene in the fuel is avoided, and the addition of ferrocene only in the required concentration insures that the above mentioned advantages of ferrocene containing fuels are achieved.

With respect to the method of the present invention it is advantageous that the ferrocene may continuously or discontinuously be added to a fuel tank or to the fuel conduit. Thus, the ferrocene may discontinuously be added to the tank of the motor vehicle after filling the tank with gasoline. On the other hand, the ferrocene may also continuously be added to the fuel conduit connecting the tank of the motor vehicle with the engine depending on the amount of fuel flowing through the fuel conduit.

It is a further advantage of the present invention to introduce the data relating to the amount of the fuel quantity flowing through the fuel conduit into the processing control means to automatically determine the corresponding required amount of ferrocene and to add the appropriate amount of ferrocene to the amount of fuel by means of the grinder. Thus, it is possible to introduce the data of the amount of the fuel quantity being filled into the tank into the processing control means after each filling of the tank with fuel and, thus, to discontinuously add ferrocene to the fuel. On the other hand, the instantaneous quantity of fuel passing through the fuel conduit may be used for continuously controlling and, therefore, for continuously adding, ferrocene to the fuel. Especially the last mentioned continuous method can automatically be acomplished in an advantageous manner.

DESCRIPTION OF THE DRAWINGS:

A better understanding of the present invention will be reached by reference to the following detailed description when read in conjunction with the accompanying drawings in which.

Figure 1:
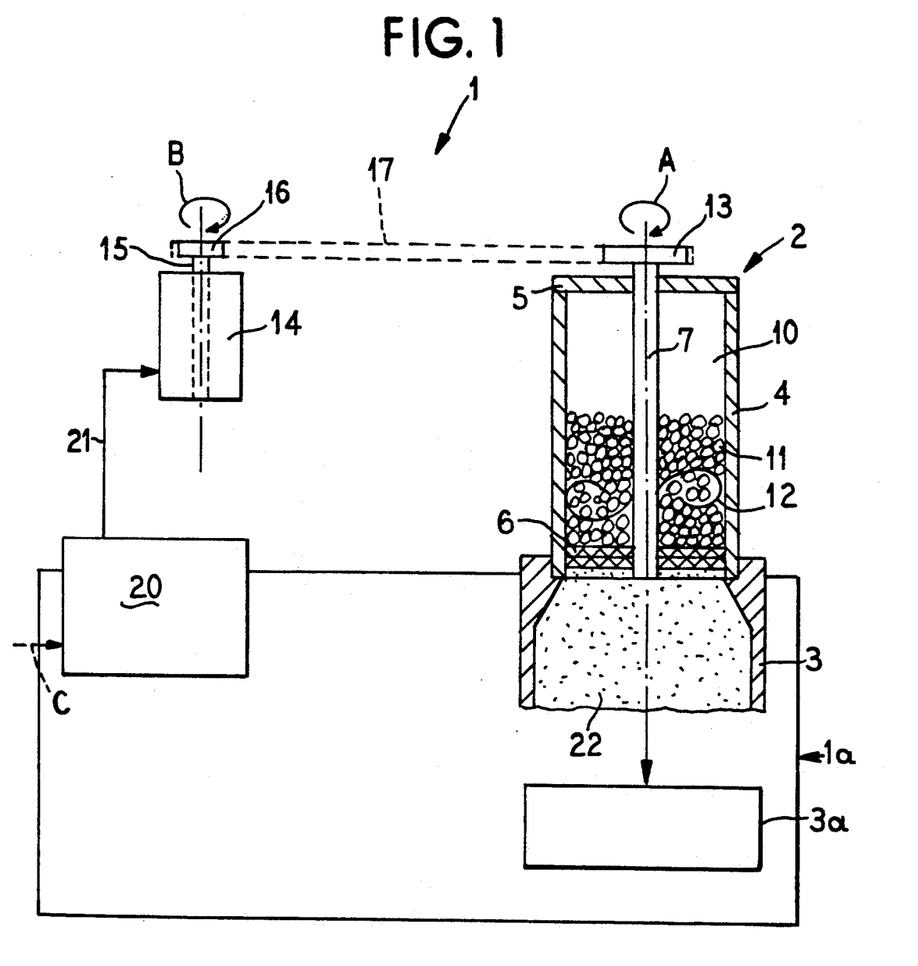
FIG. 1 is a schematic side view, partly in section, of an apparatus for directly adding solid ferrocene to fuels according to the invention.

DETAILED DESCRIPTION OF THE PREFERRED EMBODIMENTS OF THE INVENTION:

An appatus 1 according to the invention for direct solid-fortification of fuels with ferrocene (Bis ($\pi$-cyclopentadienyl)iron, $C_{10}H_{10}Fe$) is schematically presented in FIG. 1. The apparatus 1 is shown generally mounted to a structure 1a which can be, for example, a motor vehicle or a fuel fired furnace.

A grinder 2 is shown in the right half of FIG. 1, to the grinder being connected to a conduit 3 in a manner not shown in detail. The conduit 3 is part of a fuel tank or of a fuel conduit, either indicated generally at 3a.

The grinder comprises a cylindrical housing 4 and a cover 5 closing the top side of the housing 4. The end of the grinder 2 opposing the cover 5 is closed by means of grinding elements 6, one part of which is fixed to the housing 4 and the other part of which is rotatably movable relative to the housing 4 and positioned on a shaft 7 penetrating the cover 5 and the fixed, non-rotatable grinding elements. Thus, a part of the grinding elements is movable by means of the rotatable shaft 7 (see arrow A) relative to the housing 4. Therefore, a grinding chamber 10 is limited by the housing 4, the cover 5 and one part of the grinding elements 6. The grinding chamber 10 is at least partially filled with solid ferrocene provided in form of balls or pills 11.

A stirrer 12 is mounted on the shaft 7 and is rotatable therewith. The stirrer 12 is only schematically shown in FIG. 1. The stirrer 12 is spaced from the grinding elements 6. The space between the bottom edge of the stirrer 12 facing the grinding elements and the upper side of the grinding elements 6 facing to the cover 5 is about 10 to 15 mm (0.394 to 0.591 inches).

As mentioned above, the shaft 7 extends over the cover 5 and supports a gearwheel 13 on its external end. The shaft 7 is rotatably mounted in the cover 5 as well as in a part of the grinding elements 6.

A step motor 14 is schematically shown in the left half of FIG. 1. The motor includes a motor shaft 15 extending therethrough. A driving pinion 16 is fixed on the outer end of the motor shaft 15. The driving pinion 16 and gearwheel 13 of the grinder 2 are connected by means of a driving belt 17 (shown in FIG. 1 in dotted lines) such that the gearwheel 13 and the shaft 7 of the grinder 2 rotate in direction of the arrow A if the step motor 14 drives its motor shaft 15 and its driving pinion 16 in direction of arrow B.

A control means 20 is further schematically shown in the left half of FIG. 1. Said mechanism may include a programmable data processing system, i.e. a computer. The data relating to the amount of fuel being supplied to the tank during the filling of the tank or the data relating to the amount of fuel just flowing through the fuel conduit may, for example, be introduced into the control means 20, for example by means of a not shown input keyboard (see arrow C in a dotted line). The step motor 14 and the grinder 2 are driven by means of a control signal 21 such that the amount of ferrocene corresponding to the amount of fuel filled into the tank or corresponding to the instantaneous quantity of fuel flowing through the fuel conduit is added in form of fine-dispersed ferrocene particles 22.

The ferrocene within in the grinding chamber 10 may be provided in the form of pellets or pills depending on the size of the grinder. Some sizes of a ferrocene pellet are mentioned by way of examples:

| (1) | Diameter | 12 mm (0.472 inches) |
|---|---|---|
| | Length | 90 mm (3.543 inches) |
| | Mass | 12.5 grams |
| (2) | Diameter | 20 mm (0.787 inches) |
| | Length | 65 mm (2.559 inches) |
| | Mass | 23 grams |

The diameter of the ferrocene pills is for example 2.5 mm (0.098 inches) or 5 mm (0.197 inches), wherein the mass of each first mentioned pill (diameter 2.5 mm) is 0.1 grams and the mass of each last mentioned pill (diameter 5 mm) is 0.2 grams.

The rotating speed of the step motor 14 and of the grinder 2 is also adjustable by the control mechanism means 20. The control software enables that the delay cycles between two rotating steps may vary between 1 and 2000 milliseconds (ms) to adjust thereby the speed. A preferred rotating speed is about 0.25 revolutions per second. In order to reproducibly add also small amounts of ferrocene to the fuel the step motor 14 and the control means 20 are manufactured and adapted to each other such that the grinder 2 is rotatable in steps of angle of at least about 1°.

In one embodiment of the present invention, it is particularly advantageous to install the above mentioned apparatus in a motor vehicle including an Otto-engine or a Diesel-engine in connection with a particle filter system being positioned downstream of the Diesel-engine. It is also contemplated to install said apparatus into a furnace for light heating oil.

The measuring results of the above described apparatus are shown in FIG. 2 to 5, respectively. The mass of the ground ferrocene is respectively shown above the number of revolutions of the grinder. The number of revolutions of the grinder amounts according to FIG. 2 between 1 and 10, according to FIG. 3 between 2 and 20, according to FIG. 4 between 4 and 40, and according to FIG. 5 between 10 and 100. For each number of revolutions shown in the diagrams, the whole mass of ferrocene obtained thereby is determined. This mass is indicated in the tables below the diagrams under the item "mass sums" and may be read off from the left ordinate in the diagram shown above the respective table. From the diagrams shown in FIG. 2 to 5 it is apparent that the mass sums linearily increase with the number of revolutions of the grinder. As a result, the ground mass of ferrocene at 10 revolutions (see FIG. 2) is about 10 times higher than the mass of the ground ferrocene at one revolution, the mass of the ground ferrocene at 100 revolutions (see FIG. 5) is about 10 times higher than the mass of the ground ferrocene at ten revolutions.

Figure 5:
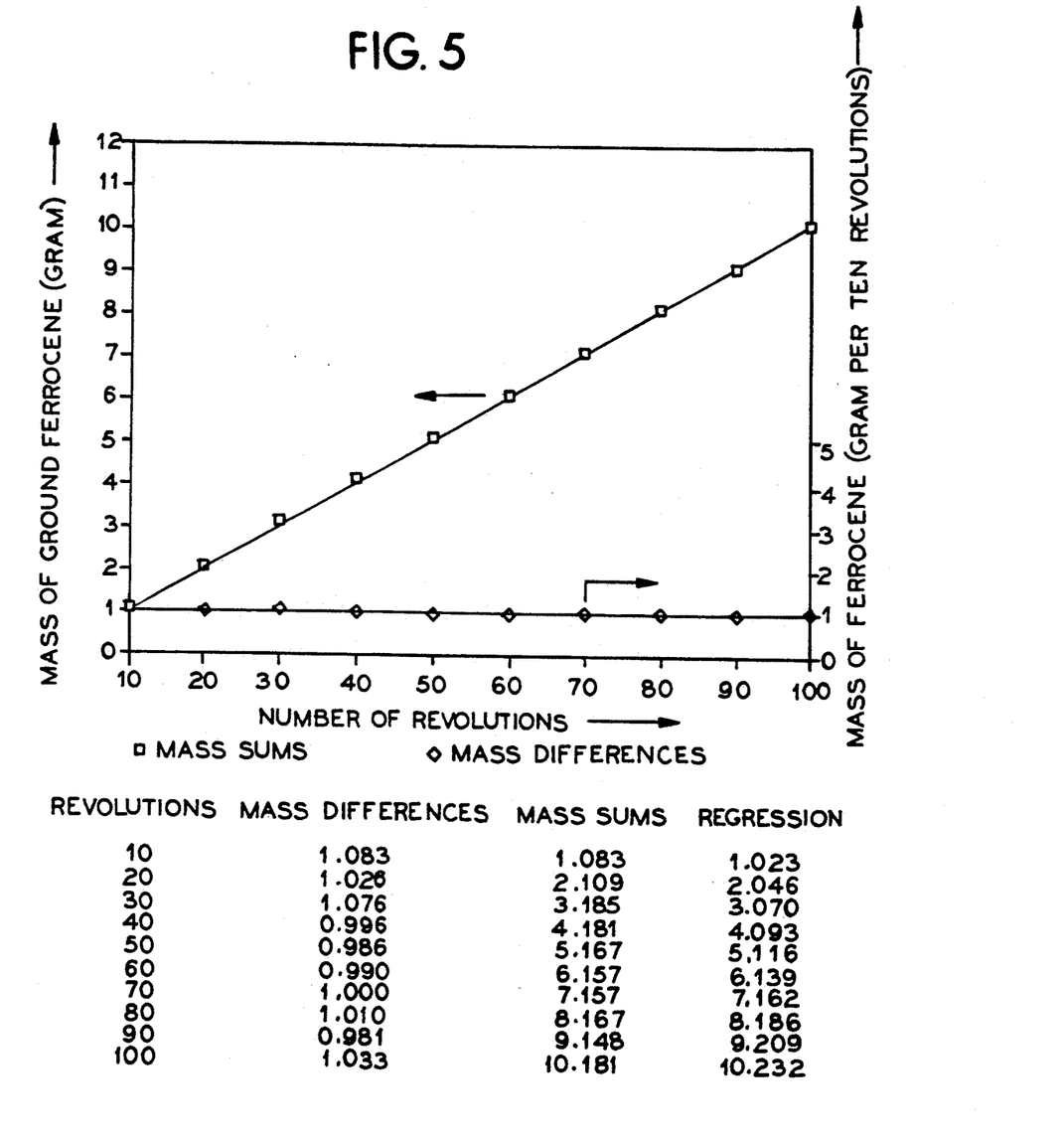

Moreover, mass differences are also shown in FIG. 2 to 5, i.e. the masses of ferrocene, which are obtained by one revolution (FIG. 2), by two revolutions (FIG. 3), by four revolutions (FIG. 4) and by ten revolutions (FIG. 5).

Figure 2:
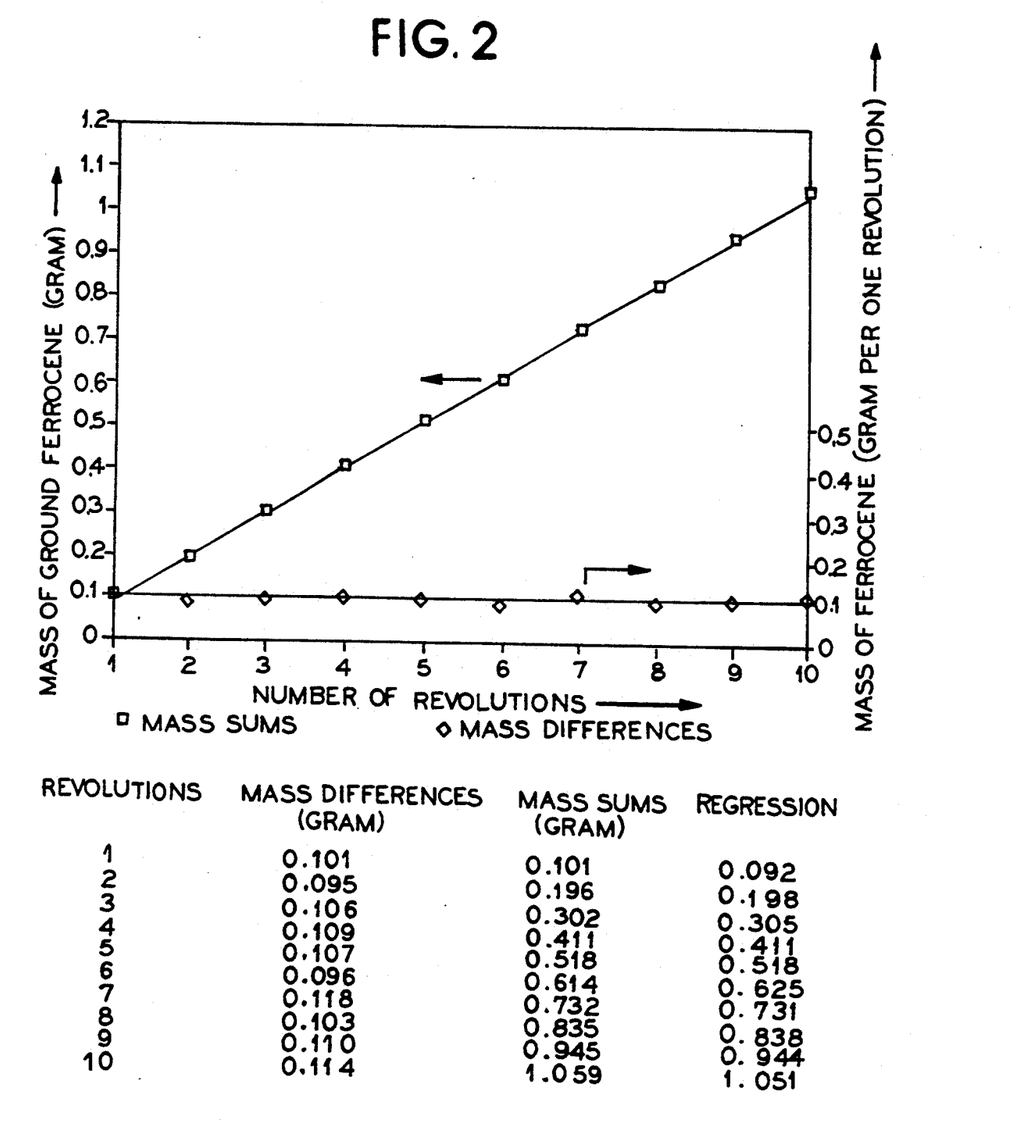
FIG. 2 to FIG. 5 are a representation of the measuring results being achieved with the apparatus according to FIG. 1 for different numbers of revolution of a grinder of the apparatus, respectively.
Figure 3:
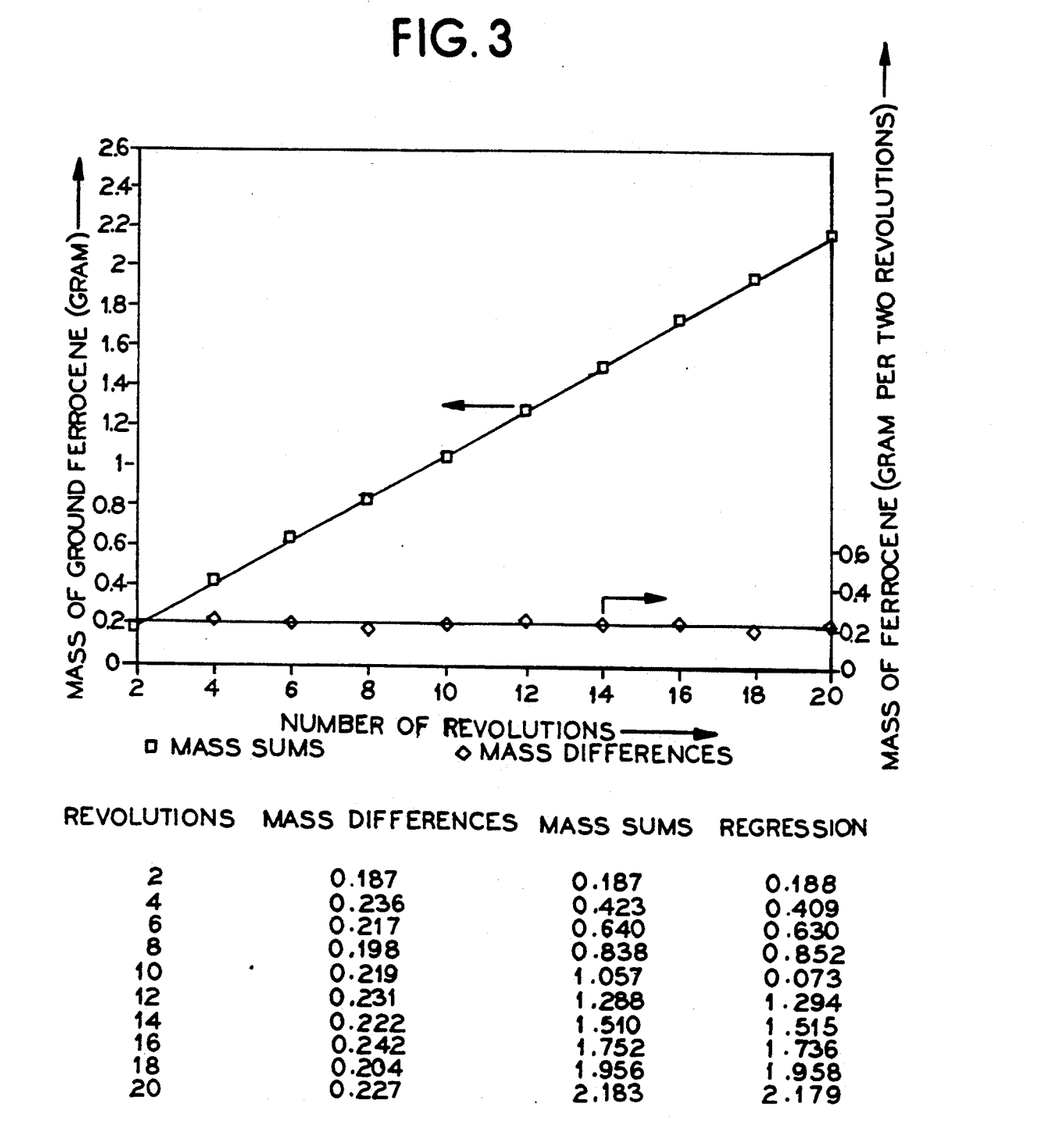
Figure 4:
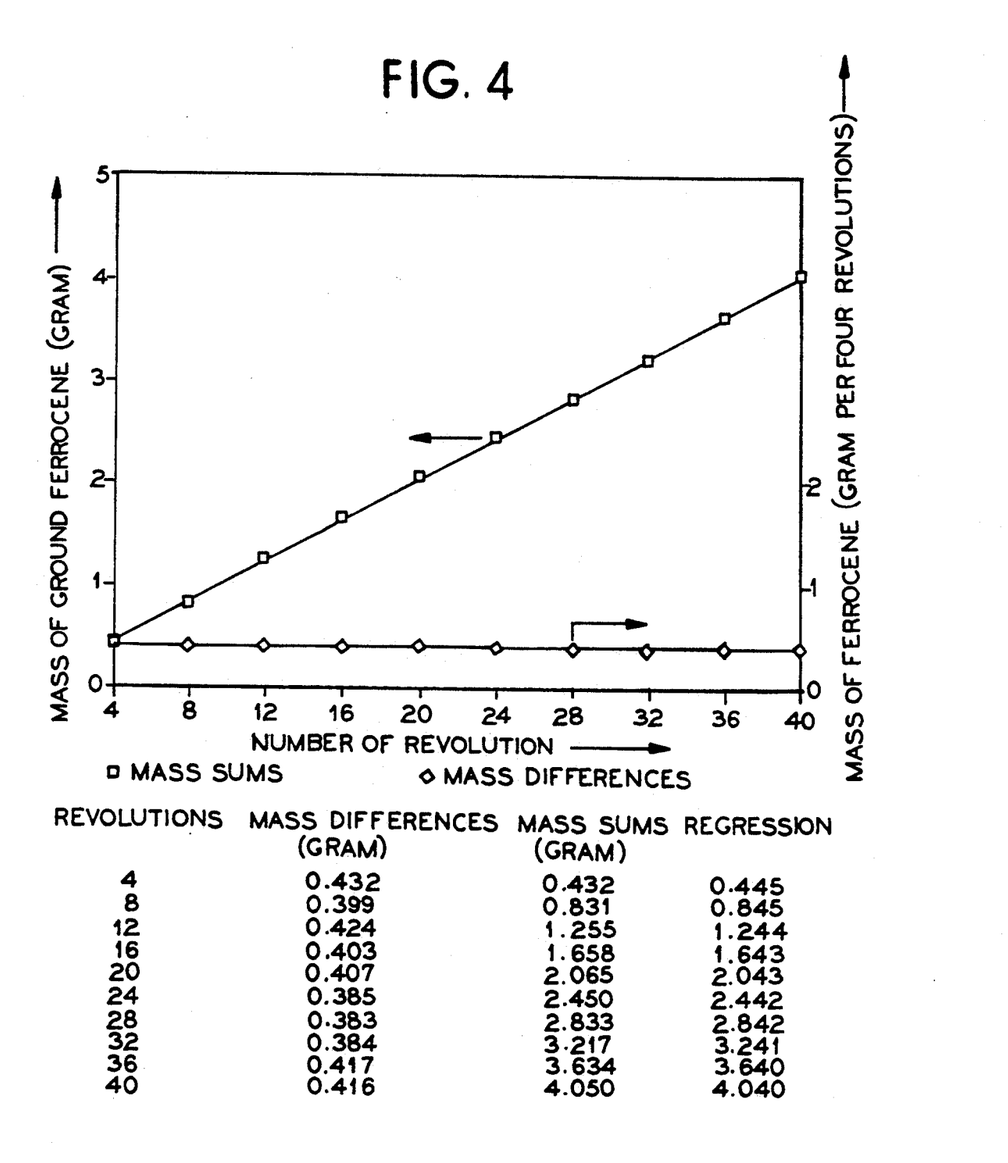

These values are to be read off from the respective right ordinate. It is apparent from FIG. 2 to 5 that the mass differences are nearly independent from the number of revolutions of the grinder. Thus, the same mass of ferrocene is produced per revolution (see FIG. 2) such that the obtained mass of ferrocene is independent from the fact whether the mass is produced for example at the fourth or ninth revolution. Since the mass of the ground ferrocene per revolution of the grinder is also nearly constant, the masses of ferrocene being obtained by two revolutions (FIG. 3) is about two times higher than the mass of ferrocene obtained by one revolution (FIG. 2), or the mass of ferrocene obtained by four revolutions (FIG. 4) is nearly two times higher than the mass of ferrocene obtained by two revolutions (FIG. 3), or the mass of ferrocene obtained by ten revolutions (FIG. 5) is about ten times higher than the mass of ferrocene obtained by one revolution (FIG. 2).

Each of the diagrams shown in FIG. 2 to 5 is based on the same rotating speed of the grinder. The speed is constant and amounts to about 0.25 revolutions per second.

Therefore, the apparatus shown in FIG. 1 provide results of high reproducibility, and achieve the above mentioned advantages of the addition of solid ferrocene to fuels.

A method according to the invention of direct addition of solid ferrocene to fuels by means of the predescribed apparatus is now described.

First of all, the amount of fuel flowing through the fuel conduit is to be measured. This amount may correspond to the amount of fuel being filled into the tank, for example, during a filling process. In a second step, the required amount of ferrocene is determined, and from the so determined amount of ferrocene a corresponding number of revolutions of the grinder is determined. Finally, the amount of ferrocene as determined before is added to the amount of fuel by actuating the step motor and the grinder.

During the above mentioned filling process of a tank, the addition of ferrocene is normally discontinuously performed, i.e. after each filling process. It is, however, possible to continuously add the ferrocene, if the throughput of fuel through the fuel conduit, for example the fuel conduit positioned between the tank and the engine, is determined and the respective amount of ferrocene is directly filled into tue fuel conduit.

According to the first described example (discontinuous adding of ferrocene), the data relating to the amount of the required quantity of ferrocene or the number of revolutions of the grinder corresponding to the quantity of ferrocene is preferably manually introduced into the control mechanism 20 (see arrow C in dotted line in FIG. 1).

In the continuous adding ferrocene, the introduction or input of the respective data is preferably automatically performed.

It is further possible to directly connect the motor shaft 15 of the step motor 14 with the shaft 7 of the grinder 2 so that gearwheel 13, driving pinion 16 and driving belt 17 are superfluous. In this case, the motor shaft 15 may be coupled to the shaft 7. It is further possible to directly control the grinder 2 by the fuel pump being included in a motor vehicle in any case so that an additional step motor is not necessary. According to the last mentioned embodiment of the present invention the addition of ferrocene to the fuel is preferably performed in a continuous manner.

We claim:

1. An apparatus for adding solid ferrocene to fuels, said apparatus comprising the following:
   grinder means, adapted to be connected to a fuel-containing element and adapted to be supplied with solid ferrocene, for delivering ground ferrocene to said fuel-containing element;
   step motor means mounted in driving connection with said grinder means for operating said grinder means at variable RPMs; and
   control means for selectively actuating said step motor means for varying the amount of said ground ferrocene delivered to said fuel-containing element by selectively limiting the number of revolutions during which said step motor means operates.

2. An apparatus according to claim 1, wherein said grinder comprises the following:
   a grinding chamber adapted to contain solid ferrocene; and
   a stirrer mounted in said grinding chamber;

whereby, in operation, said stirrer homogenizes the solid ferrocene within said grinding chamber.

3. An apparatus for adding solid ferrocene to fuels, said apparatus comprising the following:
- grinder means adapted to be connected to a fuel-containing element and adapted to be supplied with solid ferrocene for delivering ground ferrocene to said fuel-containing element;
- step motor means mounted in driving connection with said grinder for operating said grinder means at variable RPMs;
- control means for selectively actuating said step motor for metering delivery of said ground ferrocene to said fuel-containing element by selectively varying the RPM at which said step motor means operates;
- wherein said grinder means includes a grinding chamber adapted to contain solid ferrocene, a stirrer mounted in said grinding chamber, whereby, in operation, said stirrer homogenizes the solid ferrocene within said grinding chamber; and
- wherein said grinder means further comprises a rotatable shaft within said grinding chamber, with said stirrer being affixed to said shaft for rotation therewith.

4. An apparatus according to claim 1, wherein said grinder is adapted to be filled with solid ferrocene in a form chosen from a group consisting of rods, pellets, and pills.

5. An apparatus according to claim 4, wherein said grinder is adapted to be filled with ferrocene pills having a diameter of from 2.5 mm to 5 mm.

6. An apparatus according to claim 1, wherein said step motor is adapted to drive said grinder at a rotating speed of approximately 0.25 revolutions per second.

7. An apparatus according to claim 1, wherein said control means is adapted and constructed to actuates said grinder in rotational steps of approximately 1° of angular rotation.

8. An apparatus according to claim 1, wherein said control means comprises a data processing system.

9. An apparatus for adding solid ferrocene to fuels, said apparatus comprising the following:
- grinder means adapted to be connected to a fuel-containing element and adapted to be supplied with solid ferrocene for delivering ground ferrocene to said fuel-containing element;
- step motor means mounted in driving connection with said grinder for operating said grinder means at variable RPMs;
- control means for selectively actuating said step motor for metering delivery of said ground ferrocene to said fuel-containing element by selectively varying the RPM at which said step motor means operates; and
- wherein said apparatus is mounted on a motor vehicle powered by an Otto engine connected to a fuel supply system, and said grinder is connected to a fuel-containing element forming a part of said fuel supply system.

10. An apparatus for adding solid ferrocene to fuels, said apparatus comprising the following:
- grinder means adapted to be connected to a fuel-containing element and adapted to be supplied with solid ferrocene for delivering ground ferrocene to said fuel-containing element;
- step motor means mounted in driving connection with said grinder for operating said grinder means at variable RPMs;
- control means for selectively actuating said step motor for metering delivery of said ground ferrocene to said fuel-containing element by selectively varying the RPM at which said step motor means operates; and
- wherein said apparatus is mounted on a motor vehicle powered by a Diesel engine connected to a fuel supply system, and said grinder is connected to a fuel-containing element forming a part of said fuel supply system.

11. An apparatus for adding solid ferrocene to fuels, said apparatus comprising the following:
- grinder means adapted to be connected to a fuel-containing element and adapted to be supplied with solid ferrocene for delivering ground ferrocene to said fuel-containing element;
- step motor means mounted in driving connection with said grinder for operating said grinder means at variable RPMs;
- control means for selectively actuating said step motor for metering delivery of said ground ferrocene to said fuel-containing element by selectively varying the RPM at which said step motor means operates; and
- wherein said apparatus is mounted on a fuel-fired furnace.

12. An apparatus according to claim 1, wherein said grinder is adapted to be connected to a fuel-containing element chosen from a group consisting of a fuel tank and a fuel conduit.

13. A method for directly adding solid ferrocene to fuel within a fuel conduit, said method comprising the following steps:
- providing a selectively actuable grinder;
- providing a step motor connected to said grinder, said step motor being capable of rotatably actuating said grinder;
- at least partially filling said grinder with solid ferrocene;
- measuring the amount of fuel flowing through said conduit;
- determining the amount of ferrocene required for the amount of fuel flowing through said conduit;
- determining the number of rotations of said grinder necessary to grind the amount of ferrocene required for the amount of fuel flowing through said conduit; and
- adding ferrocene from said grinder to said fuel flowing through said fuel conduit by actuating said grinder to perform said number of rotations.

14. A method according to claim 13, wherein said step of adding ferrocene further comprises continuously adding said ferrocene to said fuel.

15. A method according to claim 13, further comprising the following steps:
- providing a control means for measuring the amount of fuel flowing through said conduit, determining the amount of ferrocene required for the amount of fuel flowing through said conduit, determining the number of rotations of said grinder necessary to grind the amount of ferrocene required for the amount of fuel flowing through said conduit, and actuating said grinder to perform said number of rotations; and causing said control means to perform said steps of measuring the amount of fuel flowing through said conduit, determining the amount of ferrocene required for the amount of fuel flowing through said conduit, determining the number of rotations of said grinder necessary to grind the amount of ferrocene required for the amount of fuel flowing through said conduit, and actuating said grinder to perform said number of rotations.

16. A method for directly adding solid ferrocene to fuel within a fuel tanks, said method comprising the following steps:
   providing a selectively actuable grinder;
   providing a step motor connected to said grinder, said step motor being capable of rotatably actuating said grinder;
   at least partially filling said grinder with solid ferrocene;
   measuring the amount of fuel in said fuel tank;
   determining the amount of ferrocene required for the amount of fuel in said fuel tank;
   determining the number of rotations of said grinder necessary to grind the amount of ferrocene required for the amount of fuel in said fuel tank; and
   adding ferrocene from said grinder to said fuel in said fuel tank by actuating said grinder to perform said number of rotations.

17. A method according to claim 16, wherein said step of adding ferrocene further comprises discontinuously adding said ferrocene to said fuel.

18. A method according to claim 16, further comprising the following steps:
   providing a control means for measuring the amount of fuel in said fuel tank, determining the amount of ferrocene required for the amount of fuel in said fuel tank, determining the number of rotations of said grinder necessary to grind the amount of ferrocene required for the amount of fuel in said fuel tank, and actuating said grinder to perform said number of rotations; and
   causing said control means to perform said steps of measuring the amount of fuel in said fuel tank, determining the amount of ferrocene required for the amount of fuel in said fuel tank, determining the number of rotations of said grinder necessary to grind the amount of ferrocene required for the amount of fuel in said fuel tank, and actuating said grinder to perform said number of rotations.

19. A method for directly adding solid ferrocene to fuel within a fuel conduit, said method comprising the following steps:
   providing a selectively actuatable grinder;
   providing a motor connected to said grinder, said motor being capable of rotatably actuating said grinder;
   at least partially filling said grinder with solid ferrocene;
   measuring the amount of fuel flowing through said conduit;
   determining the amount of ferrocene required for the amount of fuel flowing through said conduit;
   determining the revolutions per minute of said grinder necessary to grind the amount of ferrocene required for the amount of fuel flowing through said conduit; and
   adding ferrocene from said grinder to said fuel flowing through said fuel conduit by actuating said grinder to rotate at said revolutions per minute.

20. A method for directly adding solid ferrocene to fuel within a fuel tank, said method comprising the following steps:
   providing a selectively actuatable grinder;
   providing a motor connected to said grinder, said motor being capable of rotatably actuating said grinder;
   at least partially filling said grinder with solid ferrocene;
   measuring the amount of fuel within said fuel tank;
   determining the amount of ferrocene required for the amount of fuel within said fuel tank;
   determining the revolutions per minute of said grinder necessary to grind the amount of ferrocene required for the amount of fuel within said fuel tank; and
   adding ferrocene from said grinder to said fuel within said fuel tank by actuating said grinder to rotate at said revolutions per minute.

* * * * *